United States Patent
Goos

(10) Patent No.: US 8,205,824 B2
(45) Date of Patent: Jun. 26, 2012

(54) AIRCRAFT FUSELAGE STRUCTURE

(75) Inventor: Joern Goos, Hamburg (DE)

(73) Assignee: Airbus Deutschland GmbH, Hamburg (DE)

( * ) Notice: Subject to any disclaimer, the term of this patent is extended or adjusted under 35 U.S.C. 154(b) by 797 days.

(21) Appl. No.: 12/077,121

(22) Filed: Mar. 17, 2008

(65) Prior Publication Data
US 2009/0230238 A1 Sep. 17, 2009

(51) Int. Cl.
*B64C 1/00* (2006.01)
*B64C 3/00* (2006.01)
(52) U.S. Cl. ............ 244/36; 244/119; 244/131; 244/132
(58) Field of Classification Search ............... 244/36, 244/119, 117 R, 123.1, 131, 123.4, 123.7
See application file for complete search history.

(56) References Cited

U.S. PATENT DOCUMENTS

| 1,862,102 | A | * | 6/1932 | Stout | 244/35 R |
| 3,249,327 | A | * | 5/1966 | Smith, Jr. | 244/123.1 |
| 5,086,996 | A | * | 2/1992 | Roeder et al. | 244/119 |
| 5,893,535 | A | | 4/1999 | Hawley | |
| 6,604,710 | B2 | * | 8/2003 | Ohmer et al. | 244/119 |
| 7,891,608 | B2 | * | 2/2011 | Rawdon et al. | 244/119 |
| 2002/0179772 | A1 | * | 12/2002 | Ohmer et al. | 244/119 |
| 2005/0115186 | A1 | * | 6/2005 | Jensen et al. | 52/633 |
| 2008/0272236 | A1 | * | 11/2008 | Rawdon et al. | 244/118.1 |
| 2009/0236473 | A1 | * | 9/2009 | Rawdon et al. | 244/120 |

OTHER PUBLICATIONS

Andrew Dunn, Diagram of space frame roof, *Wikipedia Commons*, Apr. 14, 2004, http:/commons.wikimedia.org/wiki/image:SpaceFrame02.png.

* cited by examiner

*Primary Examiner* — Tien Dinh
*Assistant Examiner* — Philip J Bonzell
(74) *Attorney, Agent, or Firm* — Greer, Burns & Crain, Ltd.

(57) ABSTRACT

An aircraft fuselage structure is described for a flying-wing aircraft, having a central area of slight curvature and side areas of greater curvature, which forms a pressure body and has an outer skin and structure reinforcements which support the outer skin. According to the invention, the structure reinforcements contain three-dimensional truss bending supports which extend over the area of light curvature and comprise first straps, which run close to the outer skin 9, and second straps, which run at a distance from the outer skin, and are connected to one another by coupling elements.

11 Claims, 2 Drawing Sheets

AIRCRAFT FUSELAGE STRUCTURE

FIELD OF THE INVENTION

The invention relates to an aircraft fuselage structure for a flying-wing aircraft according to the precharacterizing clause of Claim 1.

BACKGROUND OF THE INVENTION

Modern aircraft fuselages have their shapes optimized as pressure bodies, with a circular or approximately circular cross section. The majority of the loads which occur on the outer shell as a result of the internal pressure are in the form of tangential membrane stresses. Conventional pressurized fuselages such as these may be designed for the optimum weight for the internal pressure. The pressure-tight outer skin is typically reinforced in the fuselage longitudinal direction by longitudinal frames or stringers and in the fuselage circumferential direction by annular lateral frames. The outer skin, stringers and frames form the pressure shell. If the fuselage cross-sectional shape differs significantly from this circular shape, this additionally results in bending loads in the outer shells, which must be absorbed by appropriate additional reinforcement, and this necessarily leads to an increase in weight.

Flying-wing aircraft, which are the subject matter of futuristic designs, have shells which are curved only slightly over a large cabin, which covers a large extent in the lateral direction, over large parts of the surface. Structures which are intended to absorb the correspondingly high compression and bending forces are based on the principle of conventional design with circumferential frame reinforcements. These are to have a considerably greater physical height in order to absorb the bending loads that have been mentioned. One typical feature of these conventional designs is the formation of planar frame elements in the lateral and circumferential directions.

SUMMARY OF THE INVENTION

It is an object of the invention to provide an optimized-weight aircraft fuselage structure for a flying-wing aircraft.

This object is achieved by an aircraft fuselage structure having the features of Claim 1.

The invention provides an aircraft fuselage structure for a flying-wing aircraft, having a central area of slight curvature and side areas of greater curvature, which forms a pressure body and has an outer skin and structure reinforcements which support the outer skin. According to the invention, the structure reinforcements contain three-dimensional truss bending supports which extend over the area of slight curvature and comprise first straps, which run close to the outer skin, and second straps, which run at a distance from the outer skin, and are connected to one another by coupling elements.

According to one embodiment of the invention, the truss bending supports have a triangular cross section.

According to one embodiment, the base of the truss bending supports which have a triangular cross section is located close to the outer skin.

According to another embodiment, the base of the truss bending supports which have a triangular cross section is at a distance from the outer skin.

According to one embodiment of the invention, the first straps of the truss bending supports define the base of the triangular cross section, and the other straps define their tips.

According to one embodiment of the invention, the coupling elements which connect the straps of the truss bending supports may be formed by segments of plates.

According to another embodiment of the invention, the coupling elements which connect the straps of the truss bending supports are formed by rods.

According to one embodiment of the invention, the truss bending supports are arranged running in the aircraft lateral direction.

According to another embodiment of the invention the truss bending supports are arranged running in the aircraft longitudinal direction.

According to one embodiment of the invention, first and second truss bending supports are provided, with the first truss bending supports being provided running in a first direction and the second truss bending supports being provided running in a second direction, transversely with respect to the former, and with the first truss bending supports being connected to one another and supported by the second truss bending supports.

According to one embodiment thereof, the first truss bending supports are arranged running in the aircraft lateral direction and the second truss bending supports are arranged running in the aircraft longitudinal direction.

According to one embodiment of the invention, the second truss bending supports which run in the aircraft longitudinal direction are arranged in side areas of the fuselage, and the first truss bending supports which run in the aircraft lateral direction are arranged covering a central area of the aircraft fuselage.

The truss bending supports may be produced from metal.

The truss bending supports may also be produced from fibre-reinforced plastic.

BRIEF DESCRIPTION OF THE DRAWINGS

One exemplary embodiment of the aircraft fuselage structure according to the invention will be explained in the following text with reference to the drawing, in which.

DETAILED DESCRIPTION OF THE INVENTION

Figure 1:
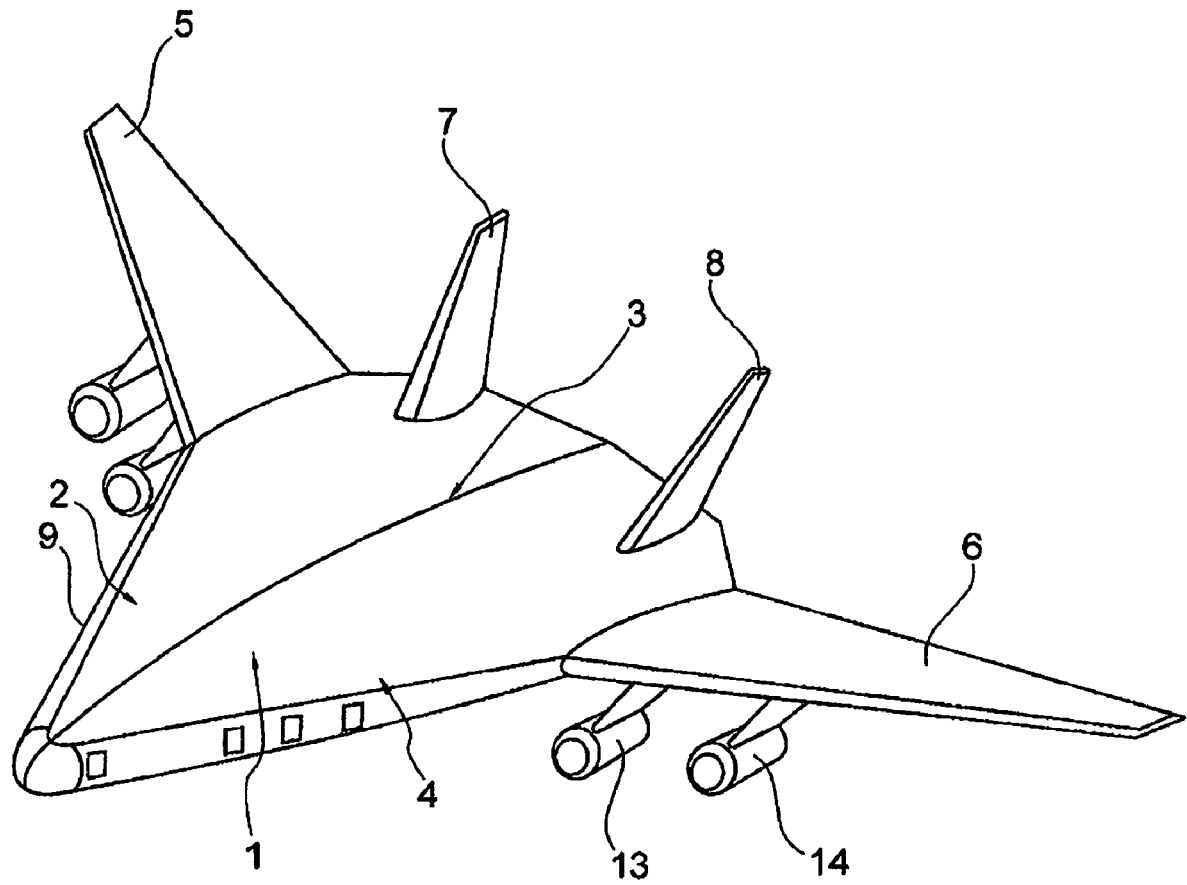
FIG. 1 shows a perspective illustration of a flying-wing aircraft, in which an aircraft fuselage structure according to one exemplary embodiment of the invention is used.

The flying-wing aircraft illustrated in perspective form in FIG. 1 comprises a fuselage area 1 (this expression is in this case still used on the basis of conventional aircraft, even though a flying-wing aircraft actually has no fuselage in the relatively narrow sense), which is formed by a central area 3 and side areas 2, 4 and in each case continues outwards in wings 5, 6. Vertical stabilization surfaces 7, 8 are arranged at the rear end of the fuselage area 1 with engines 13, 14 in each case being suspended on the underneath of each wing 5, 6. The structure of the fuselage area 1 forms a cabin in the form of a pressure body. In the central area, the cabin structure has only sight curvature, which merges into greater curvature in the side areas 2, 4. The pressure body which forms the cabin is closed by an outer skin 9.

As the schematic drawings 2 and 3 show, respectively in the form of a perspective and in cross section, the fuselage structure which forms the pressure body has structure reinforcements which support the outer skin 9 and contain three-dimensional truss bending supports 10, 11 which extend over the area 3 where the curvature is slight.

Figures 2, 3:
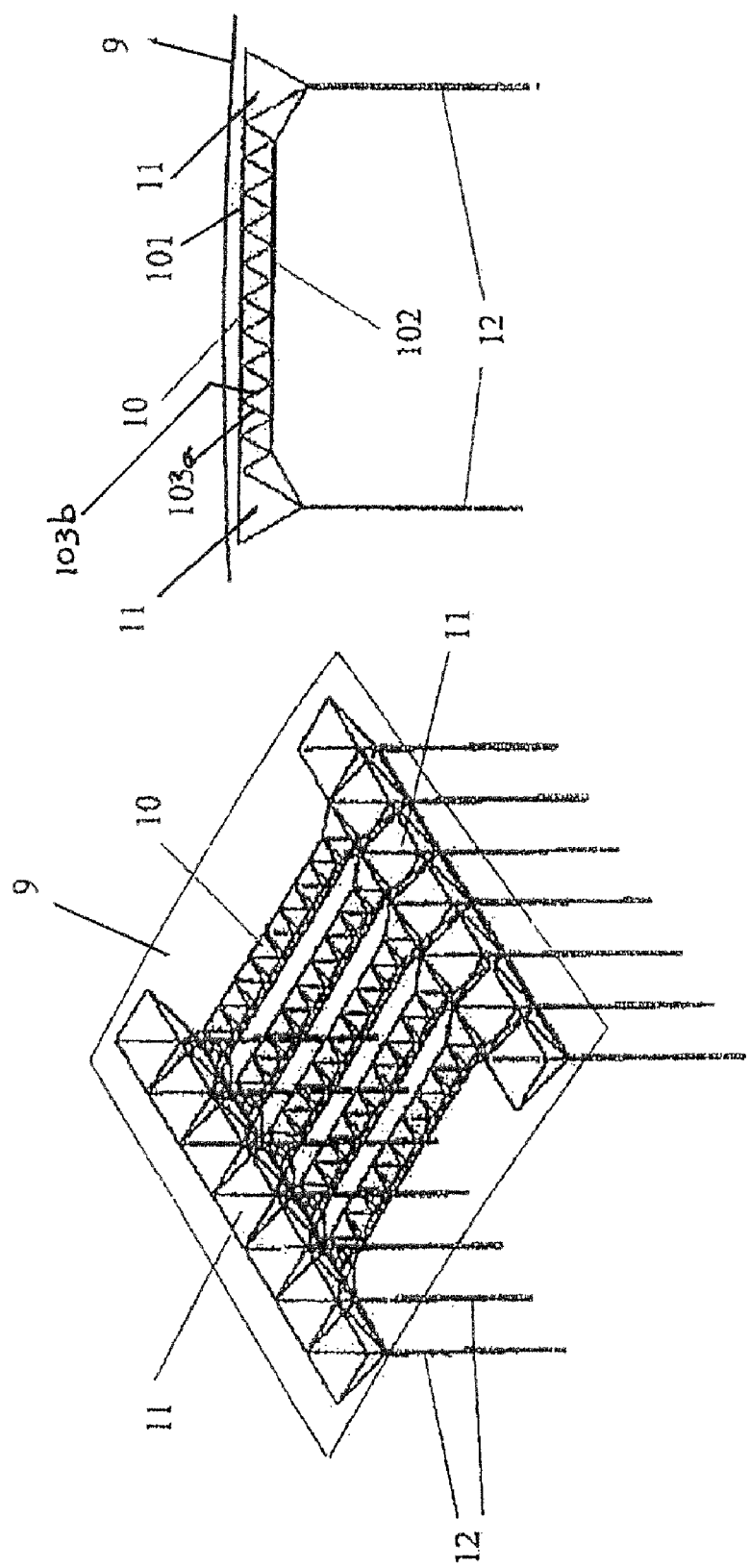
FIG. 2 shows a schematic, perspective illustration of a part of an aircraft fuselage structure according to one exemplary embodiment of the invention.
FIG. 3 shows a cross-sectional view of the schematic aircraft fuselage structure shown in FIG. 2.

In the illustrated exemplary embodiment, first truss bending supports 10 and second truss bending supports 11 are provided, of which the first truss bending supports 10 are arranged in a first direction, specifically running in the aircraft lateral direction. The second truss bending supports 11 run in a second direction, transversely with respect to this, specifically in the aircraft longitudinal direction, and connect the first truss bending supports 10 to one another, and support them. Underneath, the second truss bending supports 11 are coupled via supports 12, which are illustrated only in a highly simplified form in FIGS. 2, 3, to lower parts of the fuselage structure, which are not shown in their own right in FIGS. 2, 3.

The three-dimensional truss bending supports 10, 11 have a triangular cross section whose base is located close to the outer skin 9 in the illustrated exemplary embodiment. The base of the truss bending supports 10, 11 is defined by first straps 101 which run close to the outer skin 9, and the tip of the triangular cross section is defined by second straps 102 which run at a distance from the outer skin 9. Coupling elements 103a and 103b connect the first straps 101 and the second straps 102, and connect the second straps 102 to one another. The first straps 101, the second straps 102 and the coupling elements 103a and 103b therefore form three-dimensional structures, which have high bending strength and are able to absorb the high compression and bending forces which occur in the area 3 of slight curvature of the pressure body 15, while keeping the weight level at the same time.

As an alternative to the described embodiment, the truss bending supports 10, 11 may also be arranged with the base at a distance from the outer skin 9, or may have a different cross section.

The coupling elements 103a and 103b which connect the straps 101, 102 of the truss bending supports 10, 11 are formed in the illustrated examplary embodiment by rods 103a, although, alternatively and by way of example, they may also be formed by segments of plates 103b, or in some other way.

The truss bending supports 10, 11 may be produced from metal or from fibre-reinforced plastic, in the same way as the outer skin 9 of the fuselage structure.

What is claimed is:

1. An aircraft fuselage structure for a flying-wing aircraft, comprising:
    a central area of slight curvature and
    side areas of greater curvature, wherein the aircraft fuselage structure forms a pressure body having an outer skin supported by integrated structure reinforcements,
    wherein the structure reinforcements comprising three-dimensional first and second truss bending supports comprising a plurality of polyhedron units forming an integrated structure extending over the area of slight curvature,
    wherein the plurality of first truss bending supports being provided running in a first direction and the plurality of second truss bending supports being provided running in a second direction, transversely with respect to the former,
    wherein the truss bending supports comprise polyhedrons with a base and a tip, and
    wherein the rectangular base of the truss bending supports comprises first straps running close to the outer skin, and the tip of the truss bending support comprises second straps running at a distance from the outer skin, and the first and second straps are connected to one another by coupling elements.

2. The aircraft fuselage structure according to claim 1, wherein the base of the truss bending supports is at a distance from the outer skin.

3. The aircraft fuselage structure according to claim 1, wherein the coupling elements which connect the straps of the truss bending supports are formed by segments of plates.

4. The aircraft fuselage structure according to claim 1, wherein the coupling elements which connect the straps of the truss bending supports are formed by rods.

5. The aircraft fuselage structure according to claim 1, wherein the first truss bending supports are arranged running in the aircraft lateral direction.

6. The aircraft fuselage structure according to claim 1, wherein the first truss bending supports are arranged running in the aircraft longitudinal direction.

7. The aircraft fuselage structure according to claim 1, wherein the truss bending supports are produced from metal.

8. The aircraft fuselage structure according to claim 1, wherein the truss bending supports are produced from fibre-reinforced plastic.

9. The aircraft fuselage structure according to claim 1, wherein the first truss bending supports are connected to one another and supported by the second truss bending supports.

10. The aircraft fuselage structure according to claim 9, wherein the first truss bending supports are arranged running in the aircraft lateral direction and the second truss bending supports are arranged running in the aircraft longitudinal direction.

11. The aircraft fuselage structure according to claim 10, wherein the second truss bending supports are arranged to run in the aircraft longitudinal direction in the area of slight and greater curvatures, and
    wherein the first truss bending supports are arranged to run in the aircraft lateral direction covering the central area of the aircraft fuselage.

* * * * *